United States Patent
Chang et al.

(10) Patent No.: US 7,065,461 B2
(45) Date of Patent: Jun. 20, 2006

(54) POINT CLOUD MEASURING SYSTEM AND METHOD

(75) Inventors: Chih-Kuang Chang, Tu-cheng (TW); Li-Hua Chen, Shenzhen (CN); Xin-Yuan Wu, Shenzhen (CN)

(73) Assignee: HON HAI Precision Industry Co., LTD, Tu-cheng (TW)

( * ) Notice: Subject to any disclaimer, the term of this patent is extended or adjusted under 35 U.S.C. 154(b) by 0 days.

(21) Appl. No.: 10/950,745

(22) Filed: Sep. 27, 2004

(65) Prior Publication Data

US 2005/0114059 A1    May 26, 2005

(30) Foreign Application Priority Data

Nov. 11, 2003  (TW) .............................. 92131463 A

(51) Int. Cl.
*G06F 19/00*      (2006.01)
(52) U.S. Cl. ...................................... 702/81
(58) Field of Classification Search .................... 702/81
See application file for complete search history.

(56) References Cited

U.S. PATENT DOCUMENTS 6,512,993 B1 *  1/2003  Kacyra et al. .............. 702/159
6,738,727 B1    5/2004  Chang ........................ 702/167

* cited by examiner

*Primary Examiner*—John Barlow
*Assistant Examiner*—Cindy D. Khuu
(74) *Attorney, Agent, or Firm*—Morris, Manning & Martin; Tim Tingkang Xia, Esq.

(57) ABSTRACT

A point cloud measuring system includes client computers (1), an application server (2) and a database (3). The client computers communicate with the application server, and enable uses to perform needed operations. The database stores data generated and used by the system. The application server includes: a point cloud fitting module (200) for fitting selected point clouds into an object; a coordinate system creating module (201) for creating a coordinate system; a measurement object creating module (202) for creating a measurement object according to particular objects selected by the user; a measuring module (203) for measuring the measurement object in the coordinate system; and a measurement data outputting module (204) for outputting measurement data on the measurement object, and determining whether the measurement data meet with design requirements by comparing the measurement data with corresponding design dimensions of the measurement object. A related method is also disclosed.

11 Claims, 4 Drawing Sheets

POINT CLOUD MEASURING SYSTEM AND METHOD

BACKGROUND OF THE INVENTION

1. Field of the Invention

The present invention relates to measuring systems and methods, and particularly to a point cloud measuring system and method.

2. Related Art of the Invention

Product quality has long been one of the most important factors in maintaining a typical manufacturing enterprise's competitiveness. How to improve the quality of products is a fundamental ongoing pursuit of such enterprise. It is essential to verify the correctness and accuracy of components of various assembled products. With many manufactured products becoming increasingly complex, the burden of verification is growing correspondingly. There is now a burgeoning need to verify components of products rapidly and precisely. Nevertheless, many enterprises still perform verification by employing numerous manual tasks and test programs that are non-standard. This can slow down output, and can seriously affect the accuracy and consistency of the verification performed.

With the performance of computer hardware and software continually improving and with the prices of such equipment becoming more competitive, computers nowadays play a major role in the process of verification. Computer equipment has greatly facilitated the verification of objects. For example, computer aided verification (CAV) can compare a point cloud model of a manufactured object with a design model thereof, and mark difference ranges in different colors on a display. CAV can let a user easily know where and how the manufactured object is different from the design model, and can greatly improve the efficiency and accuracy of verification.

However, a user may sometimes want to know exact differences between the manufactured object and the design model, and to improve the quality of the manufactured object by changing production criteria and procedures. Current technology does not provide a system and method to obtain measurement data on the manufactured object, and conveniently and accurately compare the measurement data with design dimensions.

SUMMARY OF THE INVENTION

Accordingly, a main objective of the present invention is to provide a point cloud measuring system and method which can measure point clouds of an object to obtain measurement data on the object, and conveniently and accurately compare the measurement data with design dimensions of the object.

To accomplish the above objective, a point cloud measuring system (hereinafter "the system") in accordance with a preferred embodiment of the present invention is provided herein. The system comprises a plurality of client computers, an application server and a database. The database is for storing data used and generated by the system. The client computers are for providing user interfaces and enabling users to communicate with the application server and to perform needed operations. The application server, which performs the function of measuring point clouds, comprises: a fitting module for fitting point clouds selected by a user via a user interface of one client computer to an object; a coordinate system creating module for creating a coordinate system according to user demand and/or measurement requirements; a measurement object creating module for creating a measurement object according to objects selected by the user; a measuring module for measuring the measurement object and obtaining measurement data on the measurement object; and a measurement data outputting module for outputting the measurement data, comparing the measurement data with predetermined design dimensions of the measurement object, and determining whether the measurement data meet with design requirements.

Further, the present invention provides a point cloud measuring method, the method comprising the steps of: (a) fitting point clouds selected by a user through an user interface of a client computer to various objects; (b) creating a coordinate system according to user demand and/or measurement requirements; (c) creating a measurement object according to objects selected by the user through the user interface; (d) measuring the measurement object and obtaining measurement data on the measurement object; and (e) outputting the measurement data on the measurement object, comparing the measurement data with design dimensions of the measurement object, and determining whether the measurement data meet with design requirements.

These and other objects, advantages and novel features of the present invention will be drawn from the following detailed description of the preferred embodiment of the present invention with the attached drawings, in which:

DETAILED DESCRIPTION OF THE PREFERRED EMBODIMENT

Figure 1:
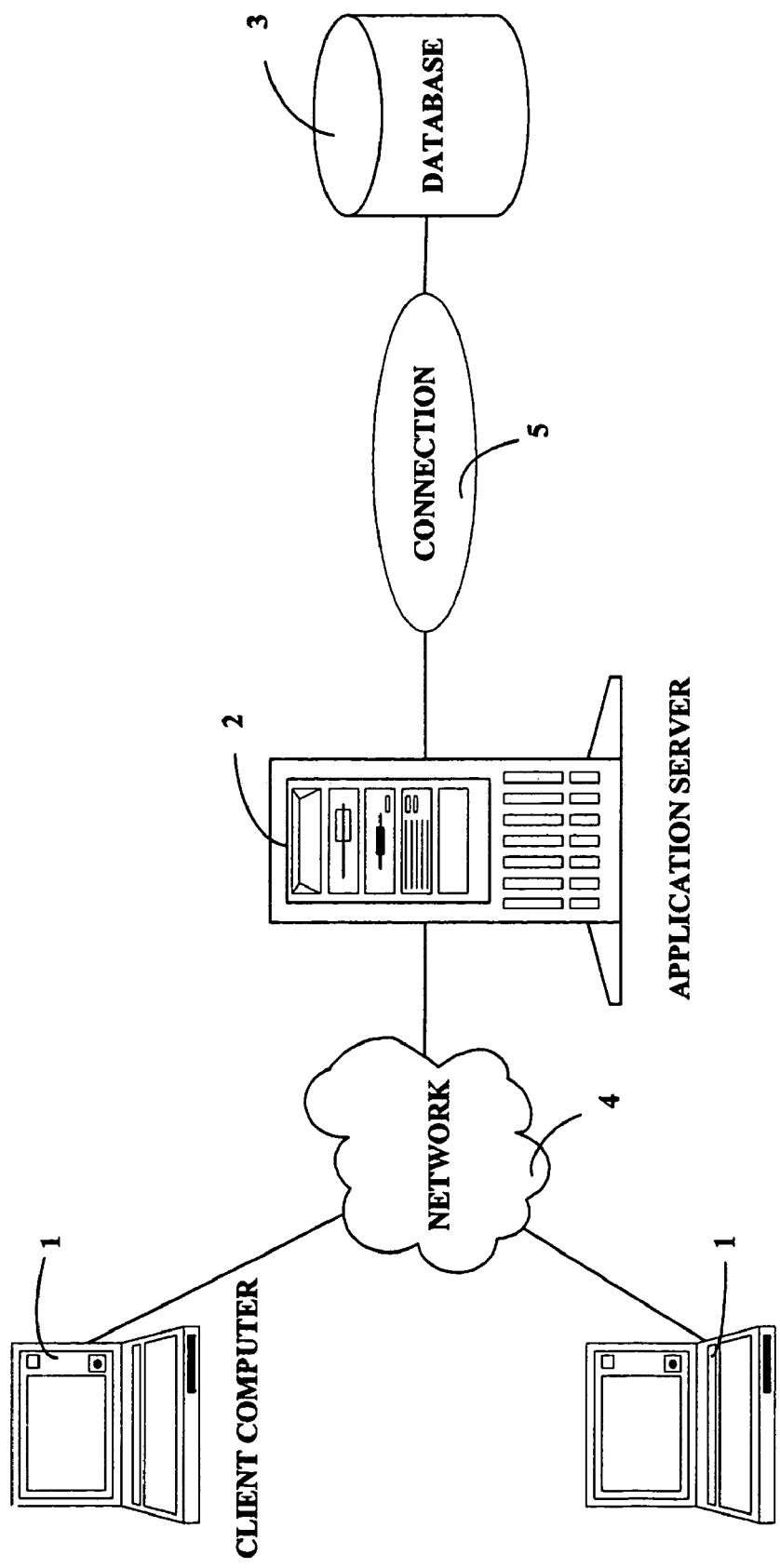
FIG. 1 is a schematic diagram of hardware infrastructure of a point cloud measuring system in accordance with the preferred embodiment of the present invention.

FIG. 1 is a schematic diagram of hardware infrastructure of a point cloud measuring system (hereinafter, "the inventive system") according to the preferred embodiment of the present invention. The inventive system comprises a plurality of client computers 1 (only two shown), an application server 2, and a database 3. The application server 2 is connected with the client computers 1 via a network 4, and is connected with the database 3 via a connection 5. The network 4 may be any suitable communication architecture required by the inventive system, such as an intranet or the Internet. The connection 5 is a kind of database connectivity, such as an Open Database Connectivity (ODBC) or a Java Database Connectivity (JDBC).

Each client computer 1 provides a user interface enabling users to communicate with the application server 2 and to perform needed operations. For example, a user may select particular point clouds, fit the selected point clouds into an object, select particular fitted objects to create a measurement object, input design dimensions of the measurement object, and obtain measurement data on the measurement object. The objects are basic geometrical figures, such as lines, circles and rectangles. The database 3 is for storing data used and generated by the inventive system.

Figure 2:
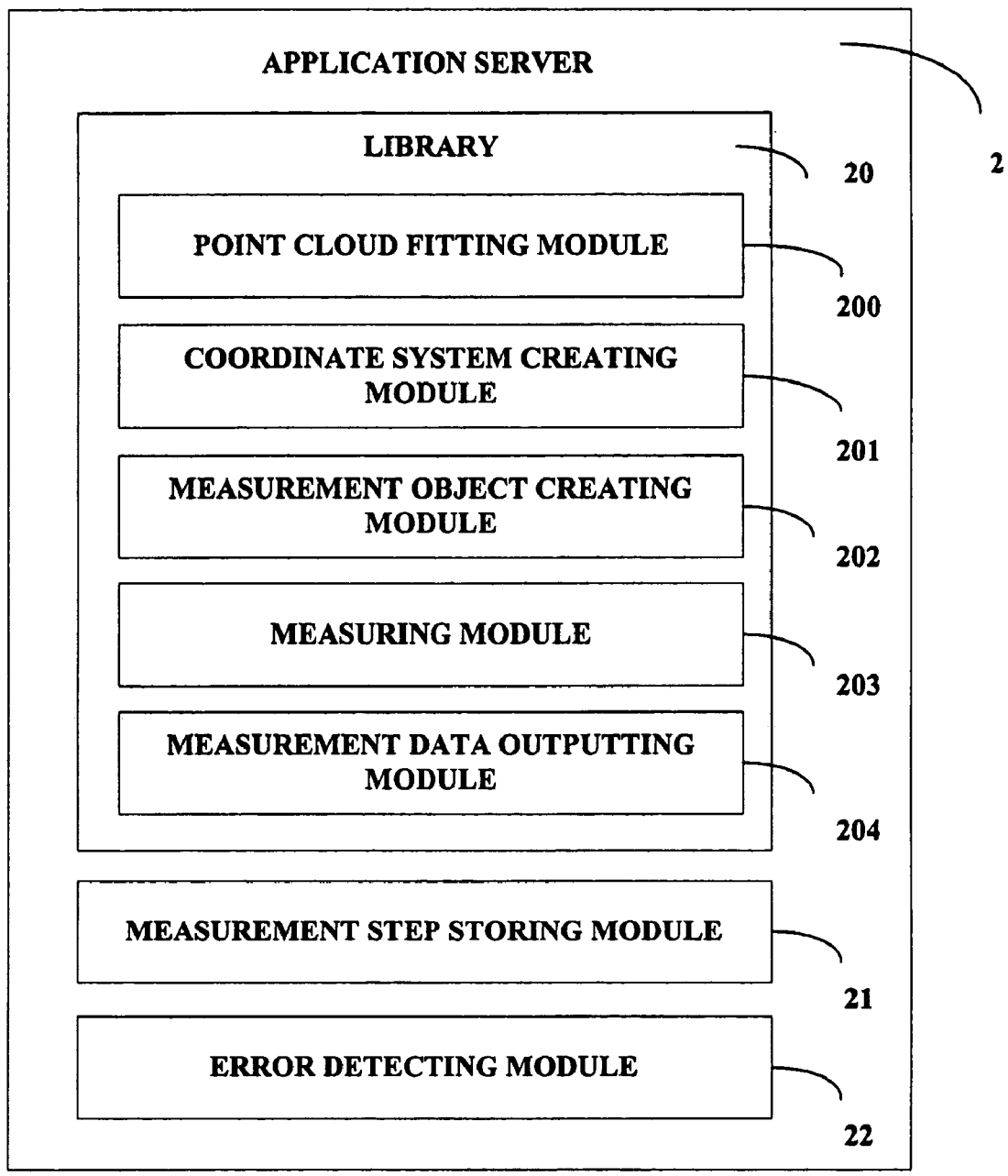
FIG. 2 is a schematic diagram of function modules of an application server of the system of FIG. 1.

FIG. 2 is a schematic diagram of function modules of the application server 2. The application server 2, which implements the function of measuring point clouds, comprises a library 20, a measurement step storing module 21 and an error detecting module 22. The library 20 comprises a point cloud fitting module 200, a coordinate system creating module 201, a measurement object creating module 202, a measuring module 203, and a measurement data outputting module 204.

The point cloud fitting module 200 is for fitting point clouds selected by a user through a user interface of one of the client computers 1 into an object. For example, the point cloud fitting module 200 may generate a circle by fitting certain point clouds selected by the user and using the least square method. The coordinate system creating module 201 is for creating a coordinate system according to user demand and/or measurement requirements. The measurement object creating module 202 is for creating a measurement object according to particular objects selected by the user. For example, when the user wants to measure a distance between midpoints of two circles, he or she can first select the two circles. Then, the measurement object creating module 202 automatically draws a line between the two midpoints. This line can be selected as a measurement object and measured in the coordinate system created by the coordinate system creating module 201. The measuring module 203 is for measuring the measurement object in the coordinate system, and obtaining measurement data on the measurement object. The measurement data outputting module 204 is for outputting the measurement data on the measurement object, and determining whether the measurement data meet with design requirements by comparing the measurement data with a corresponding design dimension of the measurement object. According to the preferred embodiment, if the measurement data fall into a predetermined range of the design dimension, the measurement data are considered as meeting with the design requirements; otherwise, the measurement data are considered as not meeting with the design requirements. The measurement data are stored in a computer-recognizable format, such as an Excel format available from the Microsoft Corporation. In the preferred embodiment, an application interface is provided by the inventive system to enable the modules 200–204 of the library 20 to be available for other systems. Any other system which is connected to the modules 200–204 through the application interface may invoke and utilize the modules 200–204.

The measurement step storing module 21 is for storing measurement steps of measuring a measurement object in the database 3. When point clouds of a same measurement object of a same type workpiece are measured a next time, the user need only rename the measurement operation and invoke the stored measurement steps. Thereupon the measurement steps are performed automatically. The error detecting module 22 is for determining whether any error occurs when the modules 200–204 perform various tasks.

Figure 3:
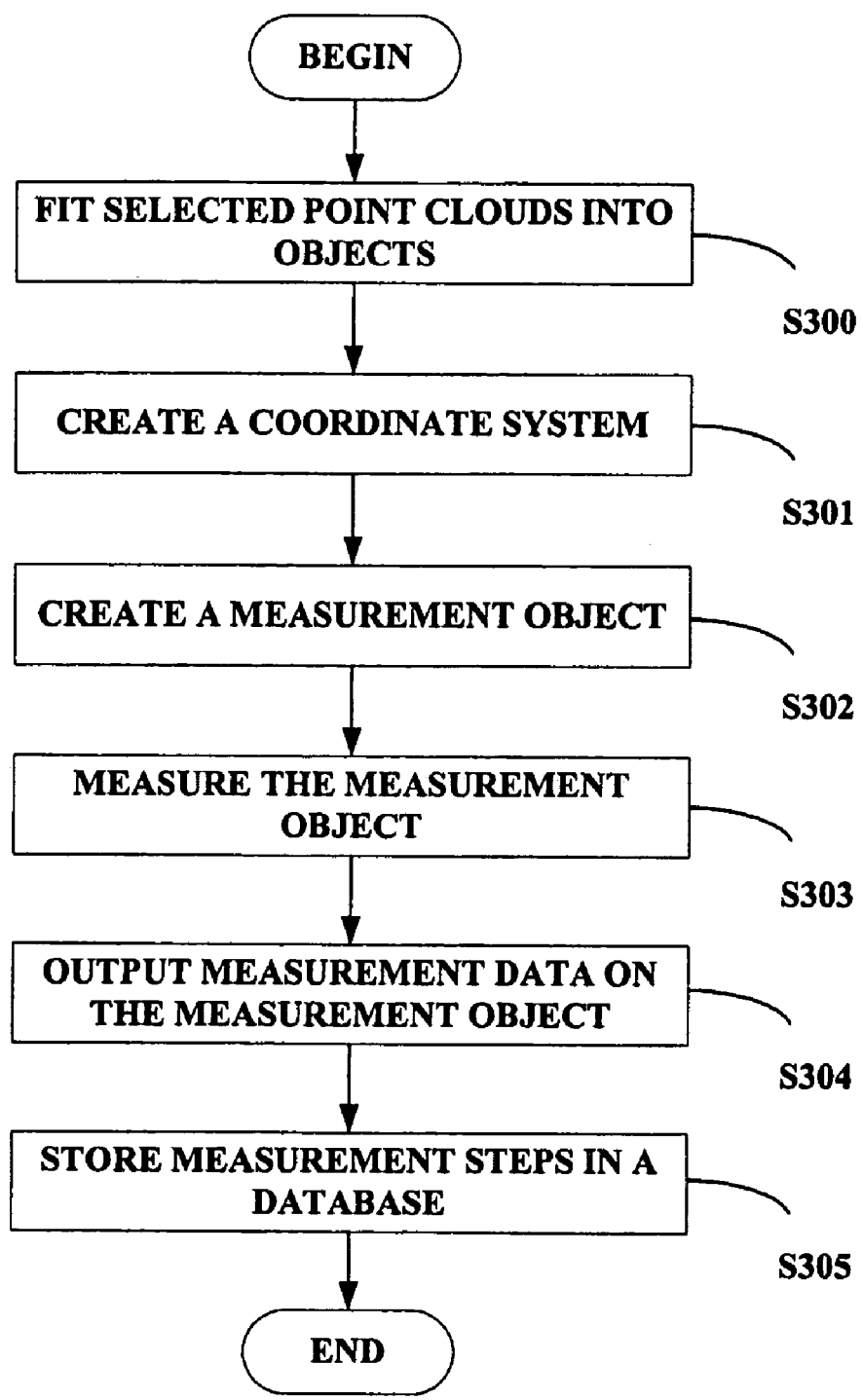
FIG. 3 is a flowchart of a preferred method for measuring point clouds and storing measurement steps, utilizing the system of FIG. 1.

FIG. 3 is a flowchart of a preferred method for measuring point clouds and storing measurement steps by utilizing the inventive system. In step S300, the point cloud fitting module 200 fits point clouds selected by a user into various objects. In step S301, the coordinate system creating module 201 creates a coordinate system according to user demand and/or measurement requirements. In step S302, the measurement object creating module creates a measurement object according to a plurality of selected objects. In step S303, the measuring module 203 measures the measurement object, and obtains measurement data on the measurement object. In step S304, the measurement data outputting module 204 outputs the measurement data, compares the measurement data with a design dimension of the measurement object, and determines whether the measurement data meet with the design requirement. In step S305, the measurement step storing module 21 stores the above-described measurement steps in the database 3. When any of the modules 200–204 in the program library 20 is invoked, the error detecting module 22 determines in real time whether any error occurs, and advises the user of any error when it occurs.

Figure 4:
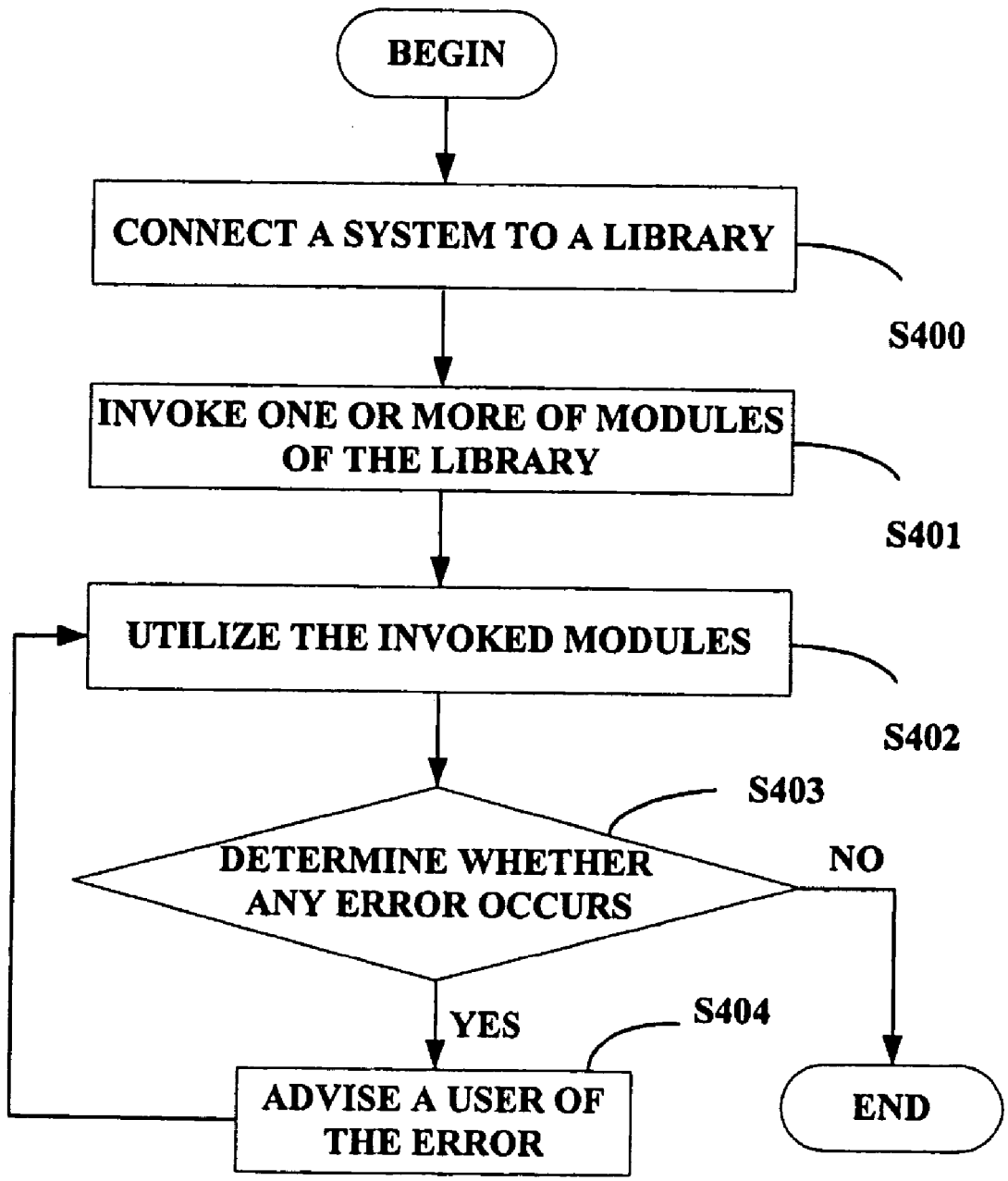
FIG. 4 is a flowchart of a preferred method for invoking modules of a library of the application server of FIG. 2.

FIG. 4 is a flowchart of a preferred method for invoking the modules 200–204 of the library 20 according to the preferred embodiment of the present invention. In step S400, a user connects another system (hereinafter, "the other system") to the library 20 through the application interface provided by the inventive system. In step S401, the user follows instructions stored in the database 3 to invoke one or more of the modules 200–204 in the library 20. In step S402, the other system utilizes the invoked module(s) 200–204. In step S403, the error detecting module 22 determines whether any error occurs when the other system utilizes the module(s) 200–204. If any error occurs, in step S404, the error detecting module 22 advises the user of the error, whereupon the procedure returns to step S402. If and when the module(s) 200–204 has (have) been utilized with no error occurring, the procedure is finished.

Although the present invention has been specifically described on the basic of a preferred embodiment and a preferred method, the invention is not to the construed as being limited thereto. Various changes and modifications may be made to the embodiment and method without departing from the scope and the spirit of the invention.

What is claimed is:

1. A point cloud measuring system for automatically and accurately measuring point clouds, the system comprising a plurality of client computers and an application server, wherein:

the client computers are for providing user interfaces enabling users to communicate with the application server; and to perform needed measuring operations for point clouds; and the application server performs the function of measuring point clouds, the application server comprising:

a library, comprising:

a point cloud fitting module for fitting point clouds selected by a user through a user interface of any one of the client computers into an object;

a measurement object creating module for creating a measurement object according to objects selected by the user;

a measuring module for measuring the measurement object and obtaining measurement data on the measurement object; and a measurement data outputting module for outputting the measurement data, and determining whether the measurement data meet with design requirements by comparing the measurement data with design dimensions of the measurement object.

a measurement step storing module for storing measurement steps of measuring the measurement object in a database, in order to make the steps of measuring the measurement object available for measuring a same measurement object in future; and an error detecting module for determining in real time whether any error occurs when utilizing any of the modules of the library, and advising the user of an error that occurs.

2. The point cloud measuring system according to claim 1, further comprising a database for storing data used and generated by the system.

3. The point cloud measuring system according to claim 1, wherein the design dimensions of the measurement object are input by the user through the user interface.

4. The point cloud measuring system according to claim 1, wherein the library further comprises a coordinate system creating module for creating a coordinate system according to user demand and/or measurement requirements.

5. The point cloud measuring system according to claim 1, wherein an application interface is provided so that the modules of the library are available to be invoked and utilized by other systems.

6. A point cloud measuring method, comprising the steps of:
   fitting point clouds selected by a user through an interface of a client computer into various objects;
   creating a measurement object according to objects selected by the user through the user interface;
   measuring the measurement object and obtaining measurement data on the measurement object;
   determining whether any error occurs when performing measuring of the measurement object;
   advising the user of any error that occurs;
   outputting the measurement data on the measurement object; and
   determining whether the measurement data meet with design requirements by comparing the measurement data with design dimensions of the measurement object.

7. The point cloud measuring method according to claim 6, further comprising the step of creating a coordinate system according to user demand and/or measurement requirements.

8. The point cloud measuring method according to claim 6, further comprising the step of storing in a database steps of measuring the measurement object, in order to make the steps of measuring the measurement object available for measuring a same measurement object in future.

9. The point cloud measuring method according to claim 6, wherein the design dimensions of the measurement object are input by the user through the user interface.

10. A point cloud measuring method, comprising the steps of:
    fitting point clods selected by a user via a user interface into various object by defining said objects as a plurality of basic geometrical figures respectively;
    creating at least one measurement object definable by means of spatial relationship of every two objects having said plurality of basic geometrical figures;
    determining whether any error occurs when performing measuring of said at least one measurement object;
    advising said user of any error that occurs;
    comparing said measurement data with design dimensions of said at least one measurement object to determine whether said measurement data meet with design requirements, if no error occurs;
    obtaining measurement data by measuring said measurement object; and
    providing said measurement data based upon request from said user via a user interface.

11. The point cloud measuring method according to claim 10, further comprising the step of storing measurement steps of measuring said at least one measurement object in a database, in order to make said measurement steps of measuring said at least one measurement object available for measuring any same measurement object in future.

\* \* \* \* \*